Sept. 29, 1953     W. R. WEEKS     2,653,533
INERTIA DAMPER FOR AUTOMATIC TOASTER CARRIAGES
Filed Oct. 5, 1951
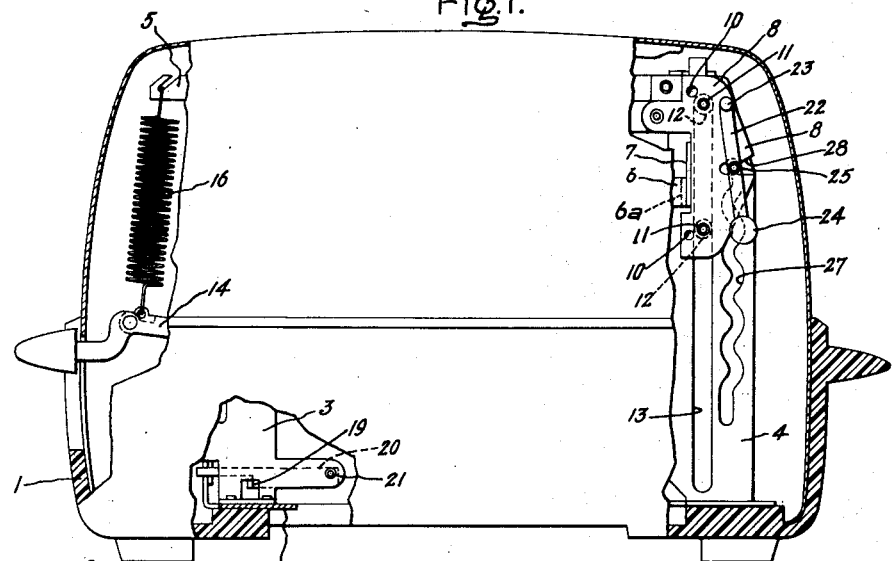
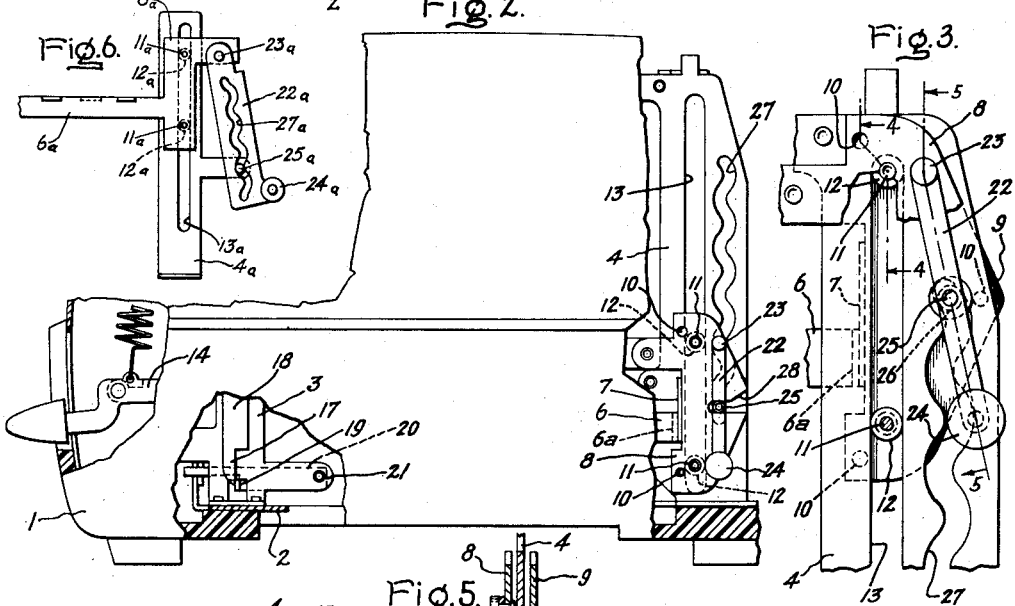
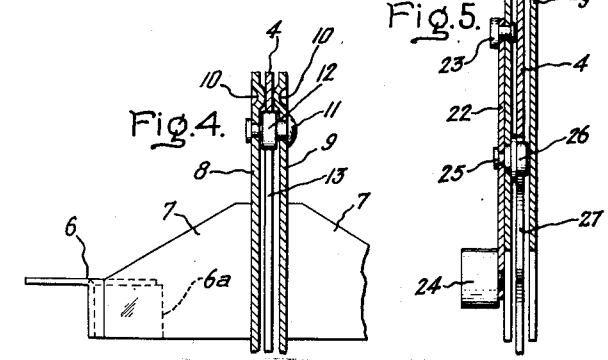
Inventor:
Walter R. Weeks,
by His Attorney.

Patented Sept. 29, 1953

2,653,533

UNITED STATES PATENT OFFICE 2,653,533

INERTIA DAMPER FOR AUTOMATIC TOASTER CARRIAGES

Walter R. Weeks, Hamden, Conn., assignor to General Electric Company, a corporation of New York Application October 5, 1951, Serial No. 249,979

1 Claim. (Cl. 99—391)

The present invention relates to automatic toasters of the type having a toaster carriage which is biased by a spring or other suitable means to its upper non-toasting position, the carriage being lowered to toasting position against the action of the biasing means, held in lowered position until the completion of the toasting operation and then released and permitted to be moved back to non-toasting position by the biasing means.

The object of the invention is to provide an improved construction and arrangement for retarding or dampening the return movement of a toaster carriage whereby a smooth, even return movement is obtained.

According to my invention, I provide in connection with the toaster frame and the toaster carriage a dampening or retarding means comprising a pivoted arm member which provides weight means at a point spaced from the pivot point and an adjacent wall member, one of said members being on the toaster frame and the other on the toaster carriage, and one of said members being provided with an undular slot and the other with a part which rides in the undular slot so that when the two members move relatively to each other, the weight means follows an undular path whereby there is imparted to it a movement which has a back and forth component approximately transverse of the path of upward movement. This back and forth component requires successive acceleration and deceleration of the weight means, thus subjecting the carriage to a retarding force which is approximately proportional to the velocity at which the carriage moves up. The undular slot is preferably sinusoidal.

In the drawing, Fig. 1 is a side view, partly in section, of a toaster embodying my invention, the toaster carriage being in its up or non-toasting position; Fig. 2 is a view similar to Fig. 1 showing the toaster carriage in its down or toasting position; Fig. 3 is a detail view, on a scale larger than that of Figs. 1 and 2, of the improved dampening mechanism; Figs. 4 and 5 are detail sectional views taken on lines 4—4 and 5—5 respectively, Fig. 3; and Fig. 6 is a detail view of a modification.

Referring to the drawing, Figs. 1 to 5 inclusive, I indicates a toaster casing or housing at the bottom of which is a metal rectangular base 2 which supports the various toaster parts enclosed in the housing. Fixed on base 2 at the front and rear ends of the casing are vertical frame posts 3 and 4, the upper ends of which are connected by a top cross bar 5. Posts 3 and 4 are in the form of flat metal plates positioned edgewise with respect to the longitudinal axis of the toaster. In the toasting compartments are the usual bread racks 6, one of which is indicated in Fig. 4. They are connected by flanges 6a to wings 7 which form a part of the toaster carriage. The wings are integral with two flat plates 8 and 9. Plates 8 and 9 are positioned on opposite sides of post 4 and are provided with struck out bosses 10 which slide on the surfaces of post 4. Plates 8 and 9 are connected together by vertically spaced rivets 11 on which are guide rollers 12 which ride in a longitudinal slot 13 in post 4. Bread racks 6 and plates 8 and 9 together form a unitary rigid carriage which slides upon and is guided by post 4.

The carriage may be moved from non-toasting position, as shown in Fig. 1, to toasting position, as shown in Fig. 2, held in such position until the toasting operation is completed and then released for return movement by any suitable means. In the present instance, I have indicated a means such as that disclosed and claimed in the application of Edwin S. Hollister, Serial No. 249,962, filed of even date herewith and assigned to the same assignee as the instant application. It comprises a lever 14 connected by suitable linkage to the carriage which, when moved from the position shown in Fig. 1 to that shown in Fig. 2, lowers the carriage against the action of a biasing spring 16 to bring a catch finger 17 on the lower end of a catch arm 18 into engagement with a trip latch 19 carried by a lever 20 which is pivoted at 21 on post 3. At the end of the toasting operation, trip latch 19 is moved down to release catch finger 17 and permit spring 16 to return the carriage to non-toasting position. Details of this mechanism are not shown, as my invention has to do only with an improved means for retarding or dampening the return movement of the carriage under the influence of spring 16. The arrangement indicated is to be taken as typical of any suitable toaster construction.

According to the embodiment of my invention shown in Figs. 1 to 5 inclusive, I provide dampening means comprising a lever or damper arm 22 pivoted at its upper end on guide plate 8, as indicated at 23, and provided at its lower end with a weight 24. At a point intermediate its ends, preferably at about its center, arm 22 is provided with a pin 25 having an enlarged end 26 which rides in a vertically extending undular slot 27 in post 4. In guide plate 8 is a notch 28 providing a clearance space for pin 25 to move in. Undular slot 27 is preferably sinusoidal. With this arrangement, when the carriage moves up under the action of spring 16, the undular slot causes the lever arm 22 to swing on its pivot after the manner of a pendulum. This imparts to the weight a movement which has a back and forth component approximately transverse of the path of upward movement. This back and forth component requires successive acceleration and deceleration of the weight which takes place against the frictional drag of end 26 on the edges of slot 27, thus subjecting the carriage to a retarding force which is approximately proportional to the velocity at which the carriage is moving up. Although my invention is not limited to the use of a sinusoidal slot, I have found that with such slot I obtain smooth even continuous acceleration and deceleration of the weight which results in quiet operation.

In addition to being efficient in operation, my invention has the advantages that it is simple in structure, comprises few parts and can be provided at low cost.

In Fig. 6 is illustrated a modification of my invention wherein the undular slot is formed in the pivoted lever arm, the pin which rides in the slot being stationary. In Fig. 6, numerals corresponding to those of Figs. 1 to 5 with the exponent "a" added have been applied to corresponding parts. As shown, lever arm 22ª is provided with an undular slot 27ª and post 4ª carries the pin 25ª, the end of which rides in the slot and functions to give the swinging motion to the lever arm. The operation of this modification is similar to that of Figs. 1 to 5, inclusive, and further description is believed to be unnecessary.

While I have shown my invention as applied to a toaster, it is equally applicable to other types of food cooking apparatus. Since many modifications may be made, it is understood that I do not wish to be limited to the particular embodiments of my invention that I have herein described and I therefore contemplate by the appended claim to cover such modifications as fall within the true spirit and scope of such claim.

What I claim as new and desire to secure by Letters Patent of the United States is:

In an automatic electric toaster having a frame, a toaster carriage which slides vertically with respect to the frame, and means biasing the toaster carriage toward non-toasting position and tending to move it vertically upward quickly from toasting to non-toasting position, means for retarding such movement comprising a vertically extending flat plate on the frame which forms a toaster carriage guide post, said flat plate being provided with a guide slot and an undular slot which extend longitudinally of said flat plate in parallel relation to each other, a pair of guide plates on the upper end of the toaster carriage positioned on opposite sides of said flat plate, guide rollers carried by said guide plate which ride in said guide slot, an arm pivoted at its upper end on said guide plate and extending downwardly alongside said flat plate, a weight on the lower end of said arm, and a pin carried by the arm midway between the ends of the arm having a head which rides in said undular slot.

WALTER R. WEEKS.

References Cited in the file of this patent

UNITED STATES PATENTS

| Number | Name | Date |
|---|---|---|
| 2,319,997 | Ireland | May 25, 1943 |
| 2,578,034 | Baltzell | Dec. 11, 1951 |